United States Patent [19]
Saito et al.

[11] 4,396,668
[45] Aug. 2, 1983

[54] MAGNETIC RECORDING MEDIUM

[75] Inventors: Seitoku Saito; Hideo Kobayashi, both of Tokyo, Japan

[73] Assignee: TDK Electronics Co., Ltd., Tokyo, Japan

[21] Appl. No.: 246,256

[22] Filed: Mar. 23, 1981

[30] Foreign Application Priority Data

Apr. 11, 1980 [JP] Japan ................................. 55-46880

[51] Int. Cl.³ ............................................... B32B 7/02
[52] U.S. Cl. .................................... 428/220; 428/694;
428/695; 428/900; 428/328; 75/0.5 AA;
252/62.55; 427/132; 360/134
[58] Field of Search ............... 428/900, 694, 695, 213,
428/220, 323, 328, 330; 252/62.55; 75/0.5 AA;
427/132; 360/134, 135, 136

[56] References Cited

U.S. PATENT DOCUMENTS

| 3,925,114 | 12/1975 | Takahashi et al. | 75/0.5 AA |
| 4,054,530 | 10/1977 | Deffeyes | 252/62.55 |
| 4,069,073 | 1/1978 | Tadokoro et al. | 252/62.55 |
| 4,091,158 | 5/1978 | Kasuga et al. | 360/134 |
| 4,165,232 | 8/1979 | Jaeckh et al. | 262/62.55 |
| 4,246,316 | 1/1981 | Aonuma et al. | 428/900 |
| 4,273,807 | 6/1981 | Berry | 427/132 |
| 4,295,879 | 10/1981 | Steck et al. | 75/0.5 AA |
| 4,318,757 | 3/1982 | Horimoto et al. | 75/0.5 AA |

FOREIGN PATENT DOCUMENTS

| 53-10106 | 1/1978 | Japan | 75/0.5 AA |
| 53-76960 | 7/1978 | Japan | 75/0.5 AA |
| 2055778 | 3/1981 | United Kingdom | 428/900 |

Primary Examiner—George F. Lesmes
Assistant Examiner—B. Johnson
Attorney, Agent, or Firm—Oblon, Fisher, Spivak, McClelland & Maier

[57] ABSTRACT

A magnetic recording medium obtained by coating a magnetic metallic powder with a binder on a non-magnetic substrate, wherein said magnetic metallic powder is mainly made of acicular particles obtained by a dry reduction process and said magnetic recording medium has a residual magnetic flux density of greater than 2,600 gauss, a coercive force of 1,300 to 1,800 Oe, a thickness of a magnetic layer of 1.5 to 3.5 μm and a C/N ratio (carrier signal/noise level) in video band of greater than 4 dB of the C/N ratio of the standard video tape.

2 Claims, 7 Drawing Figures

MAGNETIC RECORDING MEDIUM

BACKGROUND OF THE INVENTION

1. Field of the Invention

The present invention relates to a magnetic recording medium. More particularly, it relates to a magnetic recording medium for high density recording.

2. Description of the Prior Art

Heretofore, $\gamma$-$Fe_2O_3$, cobalt-doped or adsorbed $\gamma$-$Fe_2O_3$, magnetite and chromium dioxide have been known as magnetic powders used for magnetic recording media. However, magnetic characteristics such as a coercive force (hereinafter referring as Hc) and a maximum residual magnetic flux density (hereinafter referring as Br) of the magnetic powders will not be satisfactory for high density recording required in an industrial field. These magnetic powders are not suitable for magnetic recording of a short recording wavelength signal (1–0.5 $\mu$m) or a narrow track width (about 10–20 $\mu$m).

Recently, magnetic powders having characteristics suitable for high density recording have been developed. A magnetic metallic powder is one of the examples newly developed.

The typical processes for producing magnetic metallic powders are as follows;

(1) to reduce an acicular oxyhydroxide, or the acicular oxyhydroxide comprising the other metal component, or an acicular iron oxide obtained from the oxyhydroxide; or (2) to reduce a magnetic metal salt by adding a reducing agent to an aqueous solution of the magnetic metal salt.

The magnetic metallic powders obtained by reducing it in a reducible gas flow at high temperature as the step (1) are in the form of acicular particles. The particles of the magnetic powder having a width of 300 to 600 Å and an axial ratio of 5 to 15 is especially suitable for a magnetic recording medium.

The magnetic characteristics having Hc=1,3000–1,600 Oe; and saturated magnetization (hereinafter referring to as $\sigma s$) of 150 to 190 emu/g. can be easily given. The magnetic metallic powders obtained by a wet process reducing process as the (2) step are in the form of the spherical beads or granule in orientation with specific spaces or in contact each other. Sometimes, the particles of the magnetic powder is in orientation under an irregular condition. The particles are chained in the form of necklace and accordingly they are called as a chain particles.

The magnetic characteristics having Hc=1,400–1,600 Oe; and a saturated magnetization $\sigma s$=180–1,300 emu/g. can be easily given. The magnetic powder having each particle diameter of 150–800 Å is especially suitable for a magnetic recording medium.

When the acicular particles or the chain particles are respectively used without mixing, to prepare a magnetic recording tape, the following characteristics are found.

(1) The magnetic recording tape prepared by using the acicular particles has high packed density to give Br of 3,000 to 4,000 gauss (hereinafter referring to as G).

(2) The magnetic recording tape prepared by using the chain particles has relatively low packed density to give Br of 2,000 to 3,000 gauss.

The acicular particles have superior orientation to give higher packed density whereas the chain particles have inferior orientation to give relatively lower packed density. The particles suitable for the high density recording are acicular particles as easily considered.

SUMMARY OF THE INVENTION

It is an object of the present invention to provide a magnetic recording medium suitable for high density recording.

The foregoing and other objects of the present invention have been attained by providing a magnetic recording medium obtained by coating a magnetic metallic powder with a binder on a non-magnetic substrate, an improvement characterized in that said magnetic metallic powder is mainly made of acicular particles obtained by a dry reduction process and said magnetic recording medium has a residual magnetic flux density of greater than 2,600 gauss, a coercive force of 1,300 to 1,800 Oe, a thickness of a magnetic layer of 1.5 to 3.5 $\mu$m and a C/N ratio (carrier signal/noise level) in video band of greater than 4 dB of the C/N ratio of the standard video tape.

DETAILED DESCRIPTION OF THE PREFERRED EMBODIMENTS

Figure 1:
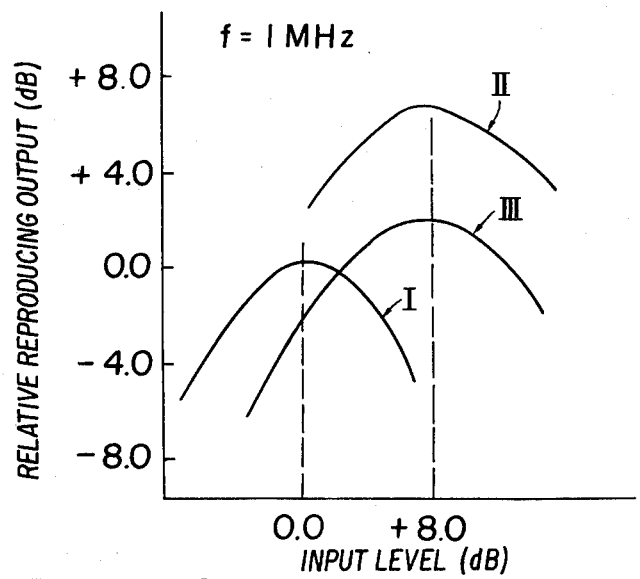
FIG. 1 is a graph showing a relation of input levels at 1 MHz and relative reproducing outputs of magnetic recording tapes comprising a dry process reduced iron powder, a wet process reduced iron powder or an oxide magnetic powder.

The magnetic recording medium of the present invention comprises acicular particles of a magnetic powder obtained by a dry process reduction.

It is experimentally found that a maximum residual magnetic flux density Br and reproducing output Vout have the following relation at a constant coercive force Hc.

$$Vout \alpha \sqrt{Br}$$

It is preferable to have higher Br.

The magnetic recording medium of the present invention comprises accicular particles obtained by the dry process reduction whereby it has Br of greater than 2,600 gauss.

When the coercive force Hc is higher, a recorded demagnetization is lower to easily attain reproducing outputs having short wavelength (0.5–1.0 μm), however, when Hc is higher, a degaussing is not easier. In view of a degaussing function of VTR, the upper limit of Hc is about 1,800 Oe.

The magnetic recording medium of the present invention has a coercive force Hc ranging from 1,300 to 1,800 Oe.

It has been found the following fact.

When a thickness of the magnetic layer of the magnetic recording medium is less than 1.5 μm, a reproducing output is low in long recorded wavelength of longer than 10–20 μm, whereas when it is more than 3.5 μm, a reproducing output is low in short wavelength (0.5–1.0 μm).

The magnetic recording medium of the present invention has a thickness of a magnetic layer ranging from 1.5 μm to 3.5 μm.

A width of a magnetic recording tape for a commercial home VTR is mainly ½ inch (12.65 mm). Thus, a newly developed VTR for a metallic powder type magnetic recording tape will be the following compact type VTR. The characteristics thereof together with VHS VTR are shown in Table 1.

TABLE 1

|  | VHS VTR (2–6 hours) | New compact VTR |
|---|---|---|
| Characteristics of Tape: |  |  |
| Coercive force (Oe) | 600–700 | 1,300–1,800 |
| Residual magnetic flux density Br (gauss) | 1,200–1,400 | 2,600–4,000 |
| Width of tape (mm) | (½ inch) 12.65 | (¼ inch) 6.25 |
| Size of magnetic head: |  |  |
| Video track width (mm) | 20–60 | 10–20 |
| Video head gap (μm) | 0.7–1.0 | 0.3–0.5 |

It is considered that a tape running speed of a newly developed VTR can be a half of the tape running speed of the conventional VTR. The magnetic recording tape has Br of more than 2 times of Br of the iron oxide type magnetic recording tape. Therefore, a width of the magnetic recording tape can be ¼ inch instead of ½ inch of the conventional tape.

The magnetic recording tape of the present invention has a width of 6.25±0.1 mm.

A C/N ratio means a ratio of carrier signal to noise level in video bands.

When a signal having one frequency f=4 MHz is recorded and reproduced, amplitude modulated signals are found near the original frequency f=4 MHz. In the conventional method, a level of the signal at 3.5 MHz is measured as a noise level.

The magnetic recording medium of the present invention has Br of greater than 2,600 gauss, Hc of 1,300 to 1,800 Oe and a thickness of the magnetic layer of 1.5 to 3.5μ. When a video head has a satisfactory saturated magnetic flux density for recording such signal (such as Bs of greater than 8 K gauss), the reproducing output at the frequency f=4 MHz is considered to be greater than 6 dB of the reproducing output of the conventional tape. The modulated noise component at 3.5 MHz is considered to be the same. When the reproducing output at f=4 MHz is 6 dB of the standard reproducing output and the modulated noise component at f=3.5 MHz is the same surface smoothness (the same surface glossness), the level may be inferior for 2 dB (higher level) according to experiments. Thus, the C/N ratio of the magnetic recording tape of the present invention is improved for greater than 4 dB in comparison with the C/N ratio of the standard magnetic recording tape. The magnetic recording medium of the present invention has a C/N ratio of greater than 4 dB of the C/N ratio of the standard magnetic recording tape. The standard magnetic tape is the TDK super Avilyn T-120 EVHS type standard magnetic recording tape.

The present invention will be illustrated by certain examples and references which are provided for purposes of illustration only and are not intended to be limiting the invention.

EXAMPLE 1

Goethite was heat-treated and the resulting acicular iron oxide was reduced in hydrogen gas flow at high temperature and the product was cooled and immersed into a solution of sodium oleate to obtain an acicular magnetic powder having a coercive force Hc of 1,480 Oe and σs of 160 emu/g. The magnetic powder is referred to as acicular particles obtained by the dry process reduction.

Iron sulfate, cobalt sulfate and chromium sulfate were mixed with an aqueous solution of sodium boron hydride to react them in a DC magnetic field to precipitate a magnetic metallic powder. The magnetic metallic powder was washed with water and treated with sodium oleate on the surface to obtain chain particles of a magnetic metallic powder having Hc of 1,450 Oe and σs of 140 emu/g. The magnetic powder is referred to as chain particles obtained by the wet process reduction.

Each magnetic paint having the following composition was prepared.

| Acicular particles or chain particles: | 300 wt. parts |
|---|---|
| Polyester urethane prepolymer: | 20 wt. parts |
| Vinyl chloride-vinyl acetate copolymer: | 24 wt. parts |
| Silicone oil: | 2 wt. parts |
| Solvent: | 1,000 wt. parts |

The components of the composition were charged into a ball mill and kneaded for 10 hours, and 15 wt. parts of triisocyanate compound was added and the mixture was thoroughly mixed for 1 hour to prepare a magnetic paint. The magnetic paint was coated on a polyethyleneterephthalate film having a thickness of 15 μm on one surface, under applying magnetic field and the coated film was dried by heating and then, the surface was processed and the product was slitted in a width of ½ inch to obtain a video tape.

Magnetic characteristics and surface glossness of the resulting video tapes are shown in Table 2.

As the magnetic characteristics, residual magnetic flux density (gauss) and a squareness ratio Br/Bm of the tape prepared by using the acicular particles obtained by the dry process reduction are superior to those of the tape prepared by using the chain particles obtained by the wet process reduction. The results are caused by higher packed density of the acicular particles than that of the chain particles.

Thus, the residual magnetic flux density Br of the tape is preferably greater than 2,600 gauss especially greater than 3,000 gauss.

TABLE 2

| Magnetic recording tape No. | (1) Hc(Oe) | (1) Br (gauss) | (1) Br/Bm | (3) Surface glossness (dB) | (3) Thickness of layer (μm) |
|---|---|---|---|---|---|
| I VHS standard tape cobalt-iron oxide | 690 | 1,200 | 0.80 | 0.0 | 4.5 |
| II Tape having acicular particles by dry process reduction | 1,410 | 3,200 | 0.83 | +3.6 | 3.2 |
| III Tape having chain particles by wet process reduction | 1,380 | 2,200 | 0.78 | +4.0 | 2.8 |

Note:
(1) Magnetic characteristic: 5,000 Oe in magnetic field applied by VSM-3 type tester.
(2) Surface glossness: Relative value to 0.0 dB of the standard tape in incident angle of 45° and reflection angle of 45° measured by GM-5 type tester manufactured by Murakami Shikisai K.K.
(3) Thickness measured by a micrometer for 10 sheets.

Figure 2:
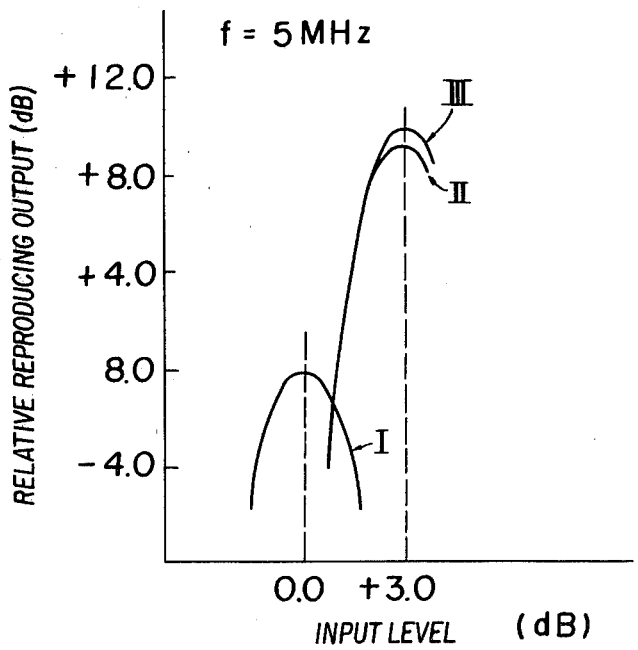
FIG. 2 is a graph showing a relation of input levels at 5 MHz and relative reproducing outputs of the same magnetic recording tapes.
Figure 3:
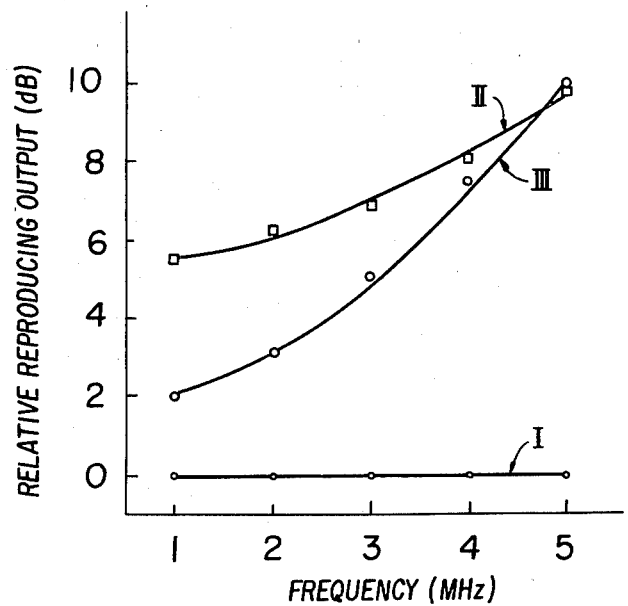
FIG. 3 is a graph showing frequency responses of relative reproducing outputs of magnetic recording tapes comprising a dry process reduced iron powder or a wet process reduced iron powder.

Each magnetic recording tape was fitted in a VHS VTR (NV-8,300) (manufactured by Matsushita K.K.) equipped with a magnetic head which is not saturated by passing a current having excess 10 dB of the normal recording current (special substance of the head: gap width of 0.5 μm; track width of 30 μm), and input and output characteristics at f=1 MHz and 5 MHz were measured. The results are shown in FIGS. 1 and 2. The maximum output characteristics at various frequencies are shown in FIG. 3. In Figures, the references (I), (II) and (III) respectively correspond to the references shown in Table 2.

As it is found in FIG. 3, the tape (II) having acicular particles obtained by the dry process reduction imparted high outputs in all bands. The noise levels of the tapes (I), (II) and (III) were substantially the same level. The tape (II) had Y-S/N ratio of 6.5 dB to that of the tape (I).

Various acicular particles having different coercive forces Hc were produced by the dry process reduction and each tape was prepared by using each of the acicular particles in the same manner.

Figure 4:
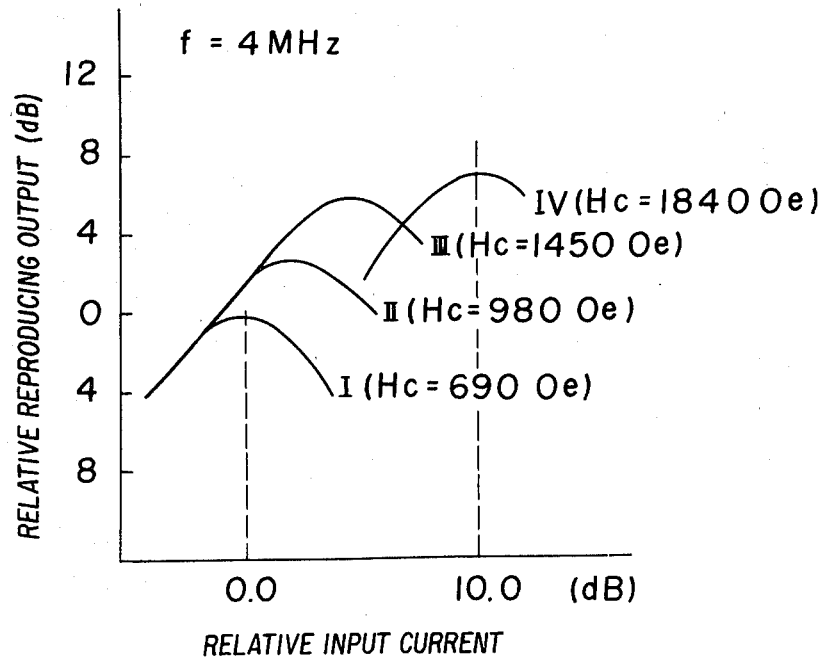
FIG. 4 is a graph showing a relation of input currents and relative reproducing outputs of the magnetic recording tapes containing each dry process reduced iron powder having different coercive force.
Figure 5:
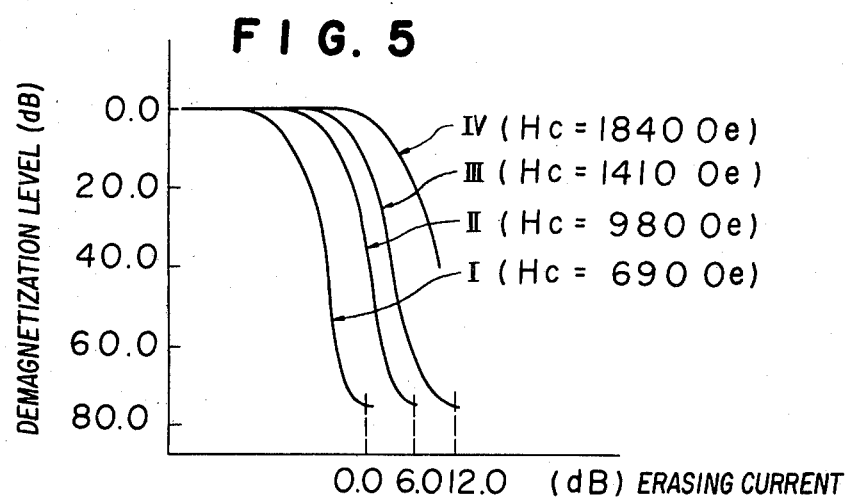
FIG. 5 is a graph showing erasing effects of the magnetic recording tapes used in FIG. 4.

Magnetic characteristics of the magnetic recording tapes are shown in Table 3. Input-output characteristics of the tapes at f=4 MHz are shown in FIG. 4. Degaussing characteristics of the tapes are shown in FIG. 5. In Figures, the references (I)–(IV) respectively correspond to the tapes shown in Table 3.

FIG. 4 shows the fact that the reproducing output is higher depending upon an increase of the coercive force of the tape. Thus, FIG. 5 shows the fact that the degaussing effect is lower depending upon an increase of the coercive force of the tape. Thus, certain improvement of the characteristics of the erasing head can be expected whereby the coercive force of the tape can be up to 1,800 Oe. The coercive force of the magnetic recording tape is preferably in a range of 1,300 to 1,800 Oe.

TABLE 3

| No. | Magnetic recording tape | Hc (Oe) | Br (gauss) | Br/Bm | Surface glossness (dB) | Thickness of layer (μm) |
|---|---|---|---|---|---|---|
| I | VHS standard tape cobalt-iron oxide | 690 | 1,200 | 0.80 | 0.0 | 4.5 |
| II | Tape having acicular particles by dry process reduction | 980 | 3,700 | 0.85 | +2.9 | 3.5 |
| III | Tape having acicular particles by dry process reduction | 1,410 | 3,200 | 0.83 | +3.6 | 3.2 |
| IV | Tape having acicular particles by dry process reduction | 1,840 | 3,100 | 0.82 | +4.1 | 3.3 |

Thicknesses of the magnetic layers were studied. Each tape was prepared by using the acicular particles obtained by the dry process reduction in the same manner.

Thicknesses of the magnetic layers are shown in Table 4.

TABLE 4

| No. | Magnetic recording tape | Hc (Oe) | Br (gauss) | Br/Bm | Surface glossness (dB) | Thickness of layer (μm) |
|---|---|---|---|---|---|---|
| I | VHS standard tape cobalt-iron oxide | 690 | 1,200 | 0.80 | 0.0 | 4.5 |
| II | Tape having acicular particles by dry process reduction | 1,380 | 4,100 | 0.84 | +4.2 | 1.2" |
| III | Tape having acicular particles by dry process reduction | 1,380 | 4,200 | 0.83 | +4.1 | 1.6" |
| IV | Tape having acicular particles by dry process reduction | 1,390 | 4,100 | 0.83 | +4.0 | 2.7" |
| V | Tape having acicular particles by dry process reduction | 1,410 | 3,200 | 0.83 | +3.6 | 3.2" |
| VI | Tape having acicular particles by dry process reduction | 1,420 | 3,200 | 0.83 | +3.5 | 3.6" |
| VII | Tape having acicular particles by dry process reduction | 1,440 | 3,200 | 0.82 | +3.1 | 4.3" |
| VIII | Tape having acicular particles by dry process reduction | 1,450 | 3,100 | 0.81 | +2.9 | 5.7" |

Figure 6:
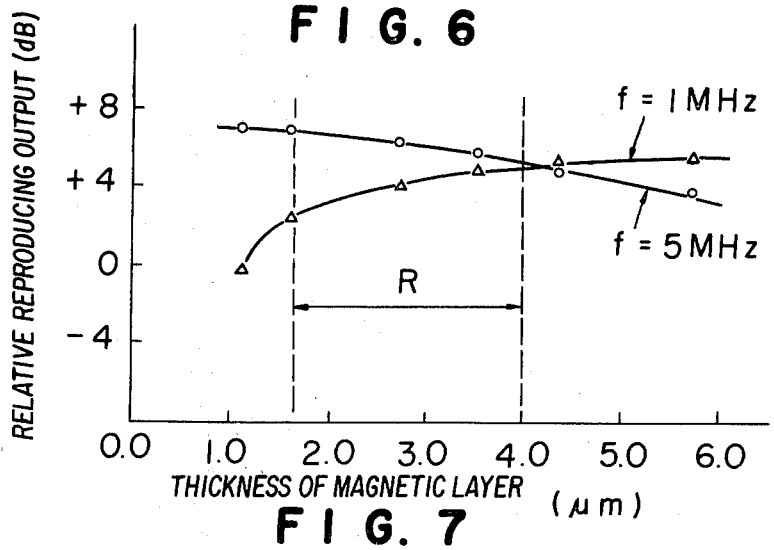
FIG. 6 is a graph showing effects of a thickness of a magnetic layer to a reproducing outputs.

Maximum reproducing output characteristics of these tapes at f=1 MHz or 5 MHz are shown in FIG. 6.

At f=1 MHz, a reproducing output is higher depending upon an increase of a thickness of the magnetic layer and was substantially saturated in a thickness of 4.5 μm.

At f=5 MHz, a reproducing output is lower depending upon an increase of a thickness of the magnetic layer.

In view of the balanced reproducing output in both of long wavelength and short wavelength, the thickness of the magnetic layer is preferably in a range of 1.5 to 3.5 μm as shown by R in FIG. 6.

In the conventional home VTR, a width of the magnetic recording tape is mainly ½ inch. Thus, the video tape having the acicular particles obtained by the dry process reduction had a residual magnetic flux density of greater than 2,600 Oe. Therefore, the same S/N ratio can be expected even though a width of a tape is less than a half of the width of the conventional tape. Thus, the width of the magnetic recording tape of the present invention can be ¼ inch to be 6.25±0.1 mm.

Video C/N ratios of various typical samples were measured. The results are shown in Table 5.

Figure 7:
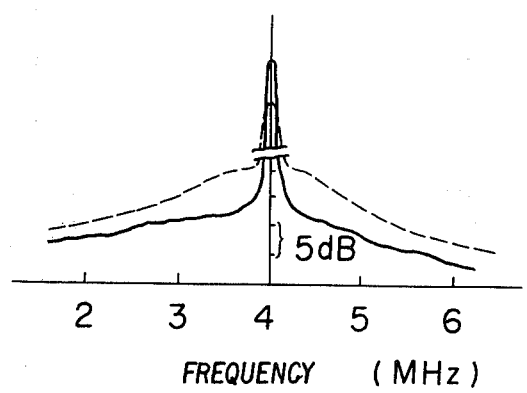
FIG. 7 shows spectra of a relative reproducing output level and a modulated noise (except the part at f=4 MHz) in recording of a signal at f=4 MHz by a standard magnetic recording tape and a magnetic recording tape of the present invention.

The magnetic recording tapes of the present invention had each C/N ratio of greater than +4 dB. FIG. 7 shows spectra of modulated noises at f=4 MHz, wherein the dotted line is for the standard tape and the full line is for the tape of the present invention.

TABLE 5

| No. | Magnetic recording tape | Hc (Oe) | Br (gauss) | C f = 4 MHz output (dB) | N f = 3.5 MHz noise level (dB) | C/N (dB) |
| --- | --- | --- | --- | --- | --- | --- |
| I | VHS standard tape cobalt-iron oxide | 690 | 1,200 | 0.0 | 0.0 | 0.0 |
| II | Tape having acicular particles by dry process reduction | 980 | 3,700 | +2.9″ | −0.2 | +3.1″ |
| III | Tape having acicular particles by dry process reduction | 1,410 | 3,200 | +5.8″ | −0.1 | +5.9″ |
| IV | Tape having acicular particles by dry process reduction | 1,840 | 3,100 | +7.1″ | +0.3 | +6.8″ |

We claim:

1. A magnetic recording tape of a width of ¼ inch having a residual magnetic flux density of greater than 2,600 gauss, a coercive force of 1,300 to 1,800 Oe, a thickness of a magnetic layer of 1.5 to 3.5 μm and a C/N ratio (carrier signal/noise level) in video band of greater than 4 dB of the C/N ratio of the standard video tape, said tape comprising a non-magnetic substrate coated with a composition comprising a magnetic metallic powder and a binder, the magnetic metallic powder comprising mainly acicular particles obtained by the dry reduction of an acicular iron oxide or oxyhydroxide in a hydrogen gas atmosphere at high temperature.

2. The magnetic recording tape according to claim 1 wherein said acicular particles of the magnetic metallic powder are surface treated to prevent a surface oxidation.

* * * * *